United States Patent [19]

Citron

[11] 4,082,875
[45] Apr. 4, 1978

[54] TAPE HAVING A LONGITUDINAL STRIP OF ADHESIVE WHICH IS USEFUL AS A MEANS FOR FRAMING SHEETS

[76] Inventor: Samuel Citron, 67 Kemble St., Boston, Mass. 02119

[21] Appl. No.: 725,980

[22] Filed: Sep. 23, 1976

[51] Int. Cl.² .......................... A47G 1/08; B32B 3/10; B32B 7/14; C09J 7/02
[52] U.S. Cl. .................................. 428/134; 40/158 R; 40/159; 427/272; 427/282; 427/284; 427/285; 428/135; 428/189; 428/191; 428/195; 428/343; 40/594
[58] Field of Search ............... 428/40, 343, 61, 57, 428/189, 191, 157, 134, 195, 211; 427/272, 282, 284, 285; 206/820; 40/159, 158 R, 125 A

[56] References Cited

U.S. PATENT DOCUMENTS

| 1,827,636 | 10/1931 | Ames ..................... 428/189 |
| 1,957,682 | 5/1934 | Turner ..................... 427/272 |
| 2,249,424 | 7/1941 | Hanington ............... 428/189 |
| 3,648,835 | 3/1972 | Yucel ..................... 428/913 |
| 3,650,794 | 3/1972 | Steinbach ............... 428/43 |
| 3,885,334 | 5/1975 | Banks ..................... 40/2 R |
| 3,930,069 | 12/1975 | Stephens ................ 427/282 |
| 4,034,843 | 7/1977 | Newman et al. ......... 428/189 |

Primary Examiner—J.C. Cannon

[57] ABSTRACT

A tape for use in securing a sheet to a surface has adhesive extending part way across one face and the full length thereof thus leaving an uncoated portion to overlie a margin of the sheet. The line of demarcation between the coated and uncoated portion is indicated by regularly spaced indicia including angles the apeces of which preferably establish both transverse and vertical reference lines or ensure accurate tape placement relative to such reference lines.

11 Claims, 6 Drawing Figures

TAPE HAVING A LONGITUDINAL STRIP OF ADHESIVE WHICH IS USEFUL AS A MEANS FOR FRAMING SHEETS

RELATED APPLICATIONS

Ser. No. 534,693, filed Dec. 20, 1974, and now abandoned, and Ser. No. 754,183, filed Dec. 27, 1976.

BACKGROUND REFERENCES

U.S. Letters Pat. Nos. 1,827,636, 1,875,804, 725,963, 3,650,794, 3,762,630.

BACKGROUND OF THE INVENTION

Adhesive coated tapes of various types are available and some are adapted for particular uses such as those referred to in the above patents.

As far as I am aware, no adhesive tape is available for use where it is desired to secure a sheet to a surface without adhesive in contact with it and also permit a reference line or lines to be established relative to the line of demarcation between the coated and uncoated portions of the tape or that line to be located accurately with respect to a reference line or lines.

THE PRESENT INVENTION

The general objective of the present invention is to provide tapes for use for the above, generally indicated purposes, an objective attained with a tape having an adhesive coat on one face that extends the full length thereof and from one edge part way across said one face with the uncoated portion of said one face to overlie a margin of the sheet to be secured. The tape has a series of indicia extending lengthwise of the tape, each indicia a geometric figure including at least one angle, the apeces of the indicia enabling the line of demarcation between the coated and uncoated portions of said one face to be oriented with respect to transverse or angular references, or such references to be established with reference to said line. In one embodiment, the indicia are apertures, in another, surface features, and, in yet another combinations of both types and, in any case, the indicia represents units of linear measurement.

BRIEF DESCRIPTION OF THE DRAWINGS

In the accompanying drawings, preferred embodiments of the invention are illustrated

THE PREFERRED EMBODIMENT OF THE INVENTION

Figure 1:
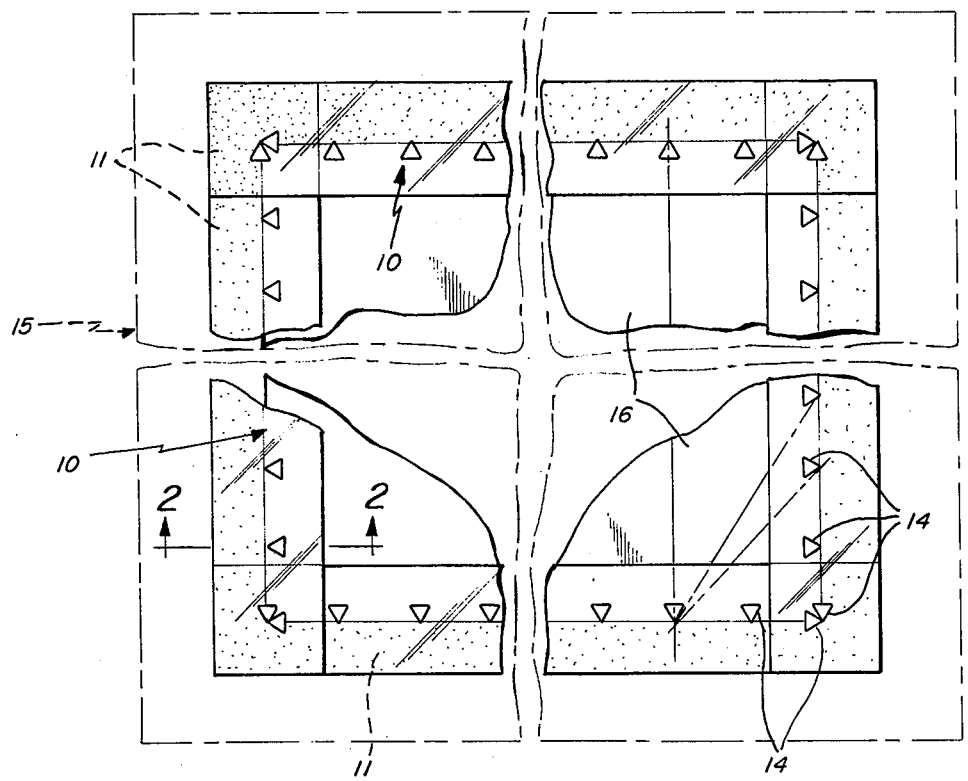
FIG. 1 is a fragmentary plan view of tape lengths in accordance with one embodiment of the invention holding a sheet on a surface.
Figure 2:
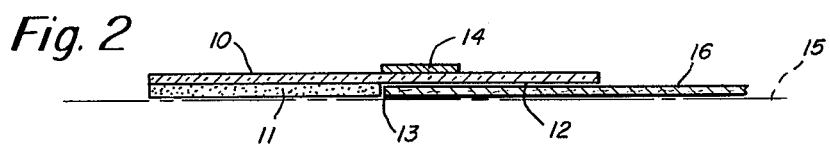
FIG. 2 is a section, on an increase in scale, taken along the indicated line 2—2 of FIG. 1.

In the embodiment of the invention illustrated by FIGS. 1 and 2, a tape, generally indicated at 10 is shown as having a layer of adhesive 11 extending lengthwise of and part way across from one edge of its undersurface thus leaving an uncoated lengthwise portion 12. The line of demarcation between the coated and uncoated portions, indicated at 13, is not readily discernable from the outer face of the tape 10 even if it is a transparent plastic.

In order that the objective of the invention, the positioning the tape with the line of demarcation 13 located precisely with reference to another line, the edge of a sheet or the sheet positioned with an edge coinciding with said line, the outer face of the tape 10 is provided with a series of indicia 14 shown as equilateral triangles, each with a side parallel to the line of demarcation overlying the uncoated portion 12 and an apex in registry with the line 13. The indicia 14 are spaced with the reference points estabilished by the apeces at the line of demarcation representing regular units of linear measurements.

It will be appreciated that with a length of tape 10 applied to a surface, a drawing board indicated at 15 for one example, it is not only easy to locate an edge of the drawing paper 16 so that it coincides with the line of demarcation 13 of that length, but it is also possible to locate another length of the tape 10 with apeces of indicia at the lines of demarcation of the two lengths coincident and with the lines of demarcation at right angles. It is thus a simple matter to establish a frame for a sheet of which the drawing paper is but one example or to frame such a sheet sincle the indicia enables tape lengths to be accurately applied along a reference line such as an edge of such a sheet. It will also be appreciated that, while the sheet is thus confined against movement, it may be easily removed and replaced as the uncoated margins may be lifted slightly.

It will also be noted that the tapes 10 serve to facilitate the use of the drawing board since the apeces along the lines of demarcation 13 function to enable vertical, horizontal and diagonal lines to be accurately located with respect to whatever linear increments the spacing of the apeces along the lines of demarcation 13 represent.

Figure 3:
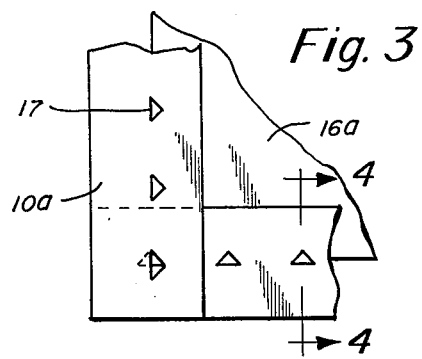
FIG. 3 is a fragmentary plan view of tape lengths similarly arranged to provide a corner of a frame.
Figure 4:
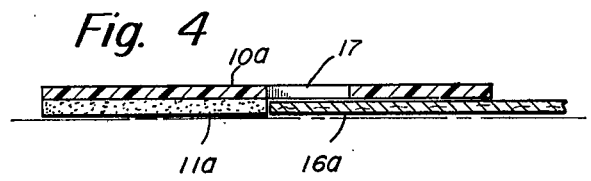
FIG. 4 is a section, on an increase in scale taken along the indicated line 4—4 of FIG. 3.

In FIGS. 3 and 4, there is shown a tape in accordance with another embodiment of the invention in which corresponding parts are distinguished by the suffix addition A applied to the appropriate reference numerals. The difference between tape in accordance with this embodiment of the invention and that previously described, is in the orientation of the indicia 17, each an equilateral triangle with a side of each now being shown as coincident with the line of demarcation 13A and the opposite apex overlying the uncoated margin 12A and the apeces represent regular increments of linear measurement. The tapes 10A may be used in the same ways as the tape 11 but in drawing board or like uses, diagonal lines cannot be drawn with uniform spacing between adjacent lengths.

Figure 5:
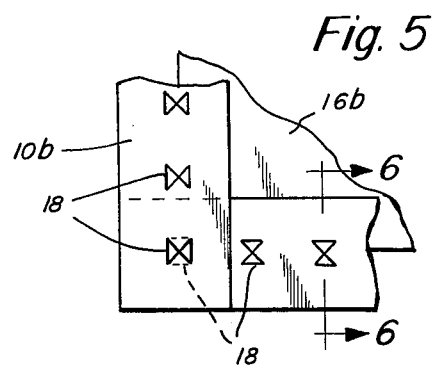
FIG. 5 is a view, similar to FIG. 3, illustrating yet another embodiment of the invention.
Figure 6:
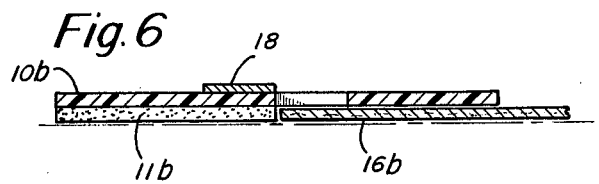
FIG. 6 is a section, on an increase in scale, taken along the indicated line 6—6 of FIG. 5.

In the embodiment of the invention illustrated by FIGS. 5 and 6, corresponding parts of the tape that are identical to the previously described embodiments are distinguished by the suffix addition B to the appropriate reference numeral.

In this embodiment of the invention, the indicia 18 is essentially a combination of the indicia 14 and 17, that is, each consists of two equilateral triangles having a common apex with opposite sides parallel, one overlying each portion of the undersurface of the tape 10B.

In any embodiment of the invention the indicia may be printed or perforations and desirably, in the case of transparent tape, they are printed but in the case of opaque tape and usually in the case of translucent tape, the indicia over the uncoated tape portions are perforations. Thus, the tape 10 is transparent and the indicia 14 printed, the tape 10A is opaque and the indicia 14A are perforations, and the tape 10B can be either but may be opaque or translucent with the parts of the inidicia over the uncoated tape portion perforations and its other half printed.

While the indicia has been described as equilateral, it may equally well be isosceles triangles, particularly when smaller increments of linear measurements are used and of course, subdivisions may be printed on the tape. Other geometric forms may be used if they provide an apex and an opposite side that can coincide with or be parallel to a line of demarcation between coated and uncoated portions.

I claim:

1. A tape for use in attaching a sheet to a surface, said tape including an adhesive coat on one face that extends the full length thereof and from one edge part way across said one face with the uncoated portion of said one face to overlie a margin of said sheet, and said tape having a series of indicia extending lengthwise of the tape, each of said indicia a figure including at least one angle providing an apex that represents a particular point lengthwise of the line of demarcation between said coated and uncoated portions of said one face, said indicia located relative to said line to enable said line to be oriented through the tape with respect to reference lines or reference lines to be established with reference to said line, said tape having an adhesive coat along but one side of said extended series of indicia.

2. The tape of claim 1 in which the apeces of the figures are located along the line of demarcation.

3. The tape of claim 1 in which each of the indicia is in the form of a triangle having at least two equal sides with the apex of the angle defined thereby at said line of demarcation and the opposite side over the uncoated portion and parallel to said line.

4. The tape of claim 3 in which the indicia are perforations.

5. The tape of claim 3 in which the indicia are printed.

6. The tape of claim 1 in which each of the indicia is in the form of a triangle having at least two equal sides with the apex of its angle defined thereby overlying the uncoated portion and the opposite side in registry with said line of demarcation.

7. The tape of claim 6 in which the indicia are perforations.

8. The tape of claim 6 in which the indicia are printed.

9. The tape of claim 1 in which each of the indicia is in the form of two triangles, each having at least two equal sides, the triangles having their apeces at the angles formed by said sides coincident and their opposite sides parallel, said apeces spaced along the line of demarcation, one triangle over each portion.

10. The tape of claim 9 in which both triangles are printed.

11. The tape of claim 9 in which the triangle over the coated portion is printed and the triangle over the uncoated portion a perforation.

* * * * *